United States Patent
Seiger et al.

[11] 3,769,088
[45] Oct. 30, 1973

[54] RECHARGEABLE BATTERIES AND CHARGE CONTROL CIRCUIT THEREFORE

[75] Inventors: Harvey N. Seiger, East Brunswick, N.J.; Paul F. Ritterman, Huntington, N.Y.

[73] Assignee: Gulton Industries, Inc., Metuchen, N.J.

[22] Filed: Aug. 12, 1968

[21] Appl. No.: 752,024

[52] U.S. Cl. .................... 136/3, 136/6 GC, 136/179
[51] Int. Cl. .......................................... H01m 35/00
[58] Field of Search ...................... 136/3, 6, 20, 24, 136/179

[56] References Cited
UNITED STATES PATENTS

| | | | |
|---|---|---|---|
| 2,104,973 | 1/1938 | Dassler | 136/3 |
| 2,578,027 | 12/1951 | Tichenor | 136/6 |
| 3,350,225 | 10/1967 | Seiger | 136/3 |
| 3,424,617 | 1/1969 | Grieger et al. | 136/6 |
| 3,438,812 | 4/1969 | Cherney et al. | 136/6 |

*Primary Examiner*—A. B. Curtis
*Assistant Examiner*—C. F. LeFevour
*Attorney*—Wallenstein, Spangenberg, Hattis and Strampel

[57] ABSTRACT

A dry cell battery system comprising: a sealed battery capable of being repeatedly charged and discharged and including a sealed casing having exposed negative and positive terminals, positive and negative battery plates within said casing and electrically connected respectively to said positive and negative terminals, said negative battery plate having a negative potential in the range of about from minus 0.7 to minus 0.9 volts and an electrolyte within said casing forming with said positive and negative battery plates a rechargeable electro-chemical system which generates substantial quantities of hydrogen during the overdischarging thereof and during the high rate charging thereof at a low temperature, a circuit connected to the battery for operating the battery under one of said conditions which generates substantial quantities of hydrogen; and a porous platinum group metal electrode in said battery which is connected through a low impedance path to said negative terminal for absorbing said substantial quantities of hydrogen.

2 Claims, 6 Drawing Figures

INVENTORS
PAUL F. RITTERMAN
HARVEY N. SEIGER

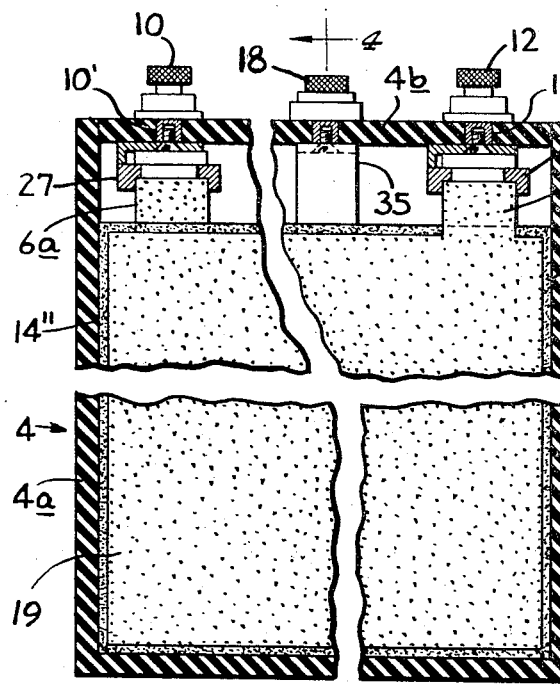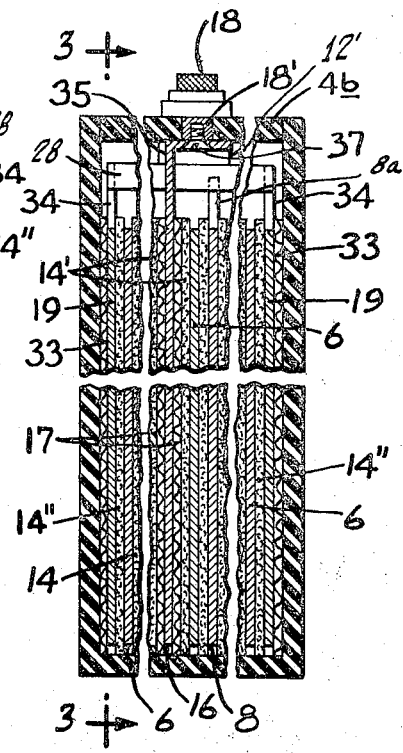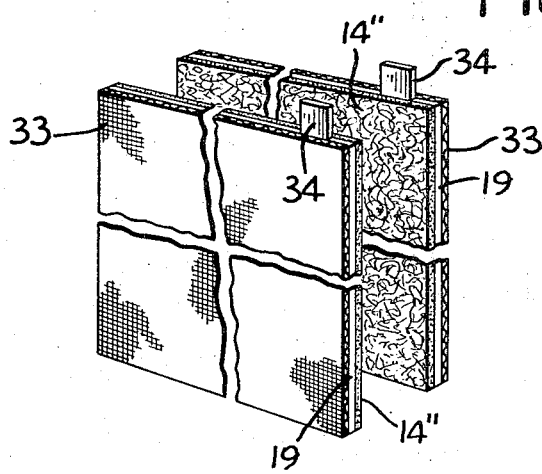

RECHARGEABLE BATTERIES AND CHARGE CONTROL CIRCUIT THEREFORE

The invention described herein was made in the performance of work under a NASA contract and is subject to the provisions of Section 305 of the National Aeronautics and Space Act of 1958, Public Law 85-568 (72 Stat. 435; 42 U.S.C. 2457.

The present invention relates to rechargeable sealed secondary dry cell batteries and has its most important application in alkaline nickel-cadmium and silver-cadmium dry cell batteries. The present invention has its most important application in those rechargeable sealed dry cell batteries where hydrogen and/or oxygen may be generated during the charging or overcharging thereof.

In sealed rechargeable batteries of the type which generate substantial quantities of oxygen during any significant overcharging thereof, the use of a relatively low charging current is usually recommended in the absence of means for preventing the overcharge thereof. Oxygen is produced during overcharge at a very slow rate at low charge rates and the small amount of oxygen then generated is readily consumed at the negative battery plates. However, at low charge rates the charging time of batteries is frequently inconveniently long, taking as much as from 8 to 12 hours. The substantial reduction of the charge time by using abnormally high charge rates has not been heretofore achieved with conventional battery constructions in the absence of overcharge preventing means because the negative battery plates (cadmium hydroxide in a nickel cadmium battery) cannot consume fast enough the large quantities of oxygen generated during a substantial overcharge thereof at high charge rates to prevent the dangerous build-up of pressure within the batteries involved.

Also, at high charge rates and low temperatures, particularly temperatures in the neightborhood of about 0°C. and lower, substantial amounts of hydrogen are frequently generated from water because part of the normally excess amount of cadmium hydroxide used to prevent hydrogen generation becomes chemically inert and all the reduceable cadmium hydroxide becomes used up before a fully charged condition is reached. Therefore there is a substantial excess of hydrogen which must be absorbed.

It has, heretofore, been proposed to incorporate special oxygen consuming electrodes in sealed rechargeable batteries connected to the negative plates or terminals of the battery where they consume substantially all of the oxygen generated during the high rate charging of the batteries. However, the oxygen consuming ability of many oxygen consuming electrodes descreases with decrease in temperature. Where the physical and/or electro-chemical conditions thereof cause the temperature to fall substantially below room temperature, the oxygen consuming ability of many of the oxygen consuming electrodes deteriorate so much that the volume of electrode material needed to absorb all of the generated oxygen at high charge rates may become prohibitive. This problem can be at least partially alleviated by using a small oxygen consuming electrode merely to detect the presence of oxygen generation occurring during a small overcharge of the battery by sensing the current flowing in the electrode and terminating the charge of the battery when this current reaches a given trip level indicating only a slight overcharge of the battery. Oxygen consuming electrodes of the type disclosed in U. S. Pat. No. 3,350,225 are especially suitable for this purpose because the current flow therethrough varies appreciably with the oxygen pressure of the battery to permit a proper selection of current to terminate charging at the desired point. It has been discovered that modest oxygen generation takes place well ahead of the fully charged condition of the battery. Thus, to effectively fully charge a battery by the detection of the current flow through the oxygen consuming electrode, the magnitude of current flow necessary to operate the sensing element which terminates the battery charging operation (i.e., the trip level) must be set to correspond to a point indicating the actual full or near fully charged condition of the battery involved.

This charge termination system proved unsatisfactory for applications where hydrogen is generated during high rate charging at low temperature because unsafe quantities of hydrogen are produced by the time the fully charged condition of the battery is reached. Also, it was surprisingly discovered that some oxygen generation occurs even after charging of the battery is terminated, so that once a battery charging operation has been terminated, the current flow through the oxygen consuming electrode may continue to exceed the trip level for a substantial period of time so that, if the battery should be quickly discharged, it may not be able to be effectively recharged in time to be used when needed again. This problem is particularly acute in power systems for satellites where the battery is charged by solar cells during the period the satellite is passing through sunlight. It is manifest that the battery should be capable of being recharged whenever it passes through sunlight.

The present invention, among other things, provides a simple and reliable means for relatively quickly and efficiently absorbing hydrogen gas generated in the battery during a rapid charge at low temperatures or during an overcharge thereof and also for quickly and efficiently absorbing any modest but troublesome quantity of oxygen which remains or is generated in the battery after termination of a charging operation, so that the current flowing in the oxygen consuming electrode which ontrols the termination of the battery charging will quickly fall below the trip level after termination thereof.

The present invention utilizes a metal from the platinum group in the periodic table, namely, platinum (which is decidedly preferred), iridium, osmium, palladium, rhodium or ruthenium. Platinum, for example, has been known to be useful as a hydrogen gas absorbing material when connected to a positive electrode of a battery through a resistor. Similarly, platinum has been known to be useful as an oxygen gas absorbing electrode when connected to the negative terminal of a battery through a resistor. In accordance with the present invention, it has be surprisingly discovered that platinum in a highly porous form has exceedingly good hydrogen gas absorging characteristics when connected through a very low impedance path to the negative terminal of a battery like a nickel or silver cadmium battery where the negative cadmium plates have a voltage of −0.8 volts. In accordance with the teachings of the prior art, it would not occur to one having ordinary skill in the art to operate a battery during charge or overdischarge so that substantial quantities of hydrogen gas are generated which must be absorbed by a platinum electrode connected to the negative terminal of the battery. Thus, it has been discovered that a porous platinum electrode connected directly to the negative terminal of a sealed, rechargeable, dry cell battery permits the battery to be operated under conditions which generate hydrogen gas at a rate as high as 0.3 milliters gas per minute of hydrogen gas per square inch of scavenger electrode surface area. By its connection to the negative terminal of the battery through a low resistance path, the porous platinum electrode also acts as an efficient oxygen gas absorbing electrode which can absorb the aforementioned oxygen which remains and is generated in the battery after termination of a charging operation thereof.

Although the use of platinum group metals operates most effectively when connected to cadmium negative battery plates, the broader aspects of the invention contemplate the use of porous platinum group metal electrodes with battery plate materials having potentials in the range of from about −0.7 volts to about −0.9 volts so metals like iron and cobalt are included.

The above and other advantages and features of the invention will be apparent from the specification to follow, the claims and the drawings wherein:

FIG. 3 is a vertical sectional view of a prismatic dry cell battery of the present invention which is utilized in the battery charge system of FIG. 1;

FIG. 4 is a transverse sectional view of the battery of FIG. 3, taken substantially along the line 4—4 therein;

FIG. 5 is a perspective view of the platinum electrode structure forming part of the battery of FIGS. 3 and 4.

Figure 1:
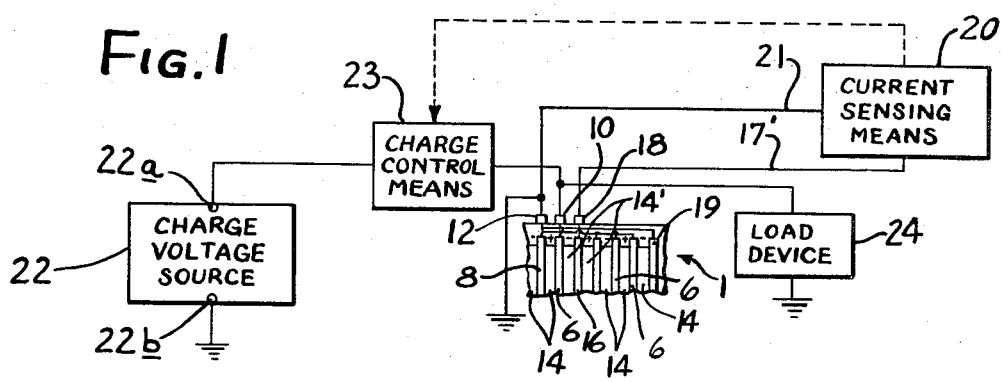
FIG. 1 is a simplified diagram of a battery charge system in which the battery of the invention is particularly useful.

In FIG. 1, a typical chargeable sealed dry cell battery is indicated by reference numeral 1 and includes a sealed casing 4 in which two or more sets of positive and negative battery plates 6 and 8 are provided which are connected through conductors respectively to positive and negative terminals 10 and 12 on the casing 4. The battery casing also includes an oxygen consuming charge condition sensing electrode 16 which, in the alkaline battery being described, is made of porous nickel or silver (preferably nickel) free of all materials except for a thin layer of electrolyte. The oxygen consuming charge condition sensing electrode 16 is connected to a terminal 18 on the outside of the casing which terminal is connected through a conductor 17′, current sensing means 20 and a conductor 21 to the negative battery terminal 12. The electrolyte is preferably carried by absorbent layers 14 of an electrolyte absorbent material. The electrode 16 is most advantageously separated from the battery plates by layers 17—17 of a perforated or apertured material like nylon netting which are immediately adjacent the electrode, and short paths of electrolyte absorbent material formed by thin layers 14′–14′ of an electrolyte absorbent material. In such case, the electrode 16 remains wet with a thin layer of electrolyte indefinitely (i.e., they do not dry out) because there is a short path between the electrode 16 and a source of water generation at the positive plates during charging of the battery. The casing 4 also contains one or more porous platinum group metal electrodes 19 connected to the positive battery plates 8 or negative casing terminal 12.

As previously indicated, the present invention has its most significant application in sealed nickel and silver-cadmium dry cell batteries. Where the battery is a nickel-cadmium battery, each completely discharged positive plate 6 would most preferably comprise divalent nickel or nickelous hydroxide ($Ni(OH)_2$) impregnated into a sintered porous nickel base plate. In silver-cadmium batteries, silver hydroxide is substituted for the nickelous hydroxide as the active material in the positive plates. The completely discharged negative plates 8 in nickel or silver-cadmium batteries each would most preferably be cadmium impregnated into a sintered porous nickel base plate. The electrolyte would most preferably be aqueous potassium hydroxide, such as a 30–34 percent solution of same.

In FIG. 1, the source of charging current for the battery 1 is identified by reference numeral 22, and where the invention is applied to an earth satellite, the charging current source would be solar cells which generate a charging voltage when subjected to sunlight.

When the positive and negative terminal 10 and 12 of the battery 1 are connected to the positive and negative terminals 22a and 22b of the charging current source 22, as the degree of charge of the battery reaches, say, 20–80 percent of a fully charged condition, oxygen is generated at the positive battery plates, the rate of the reaction increasing as a fully charged condition is reached and exceeded. Until the fully charged condition of the battery is reached, the main reaction taking place at the positive plates is the following:

$$Ni(OH)_2 + OH^- \rightarrow NiOOH + H_2O + e^- \qquad (2)$$

During overcharge of the battery, water continues to be generated at the positive plates by the following reaction:

$$4OH^- \rightarrow 2H_2O + O_2 + 4e^- \qquad (3)$$

The oxygen generated at the positive plates migrates to the oxygen consuming electrodes where the following reaction takes place:

$$4H° + O_2 \rightarrow 2H_2O \qquad (4)$$

where the rate of the reaction is proportional to oxygen pressure. The maintenance of a supply of the hydrogen atoms shown in equation (4) on the oxygen consuming electrodes 16 requires a source of electrons. These electrons are obtained from the negative battery plates during charging of the battery by the oxidation of cadmium thereat as follows:

$$2Cd + 4OH^- \rightarrow 2Cd(OH)_2 + 4e^- \qquad (5)$$

The water in the electrolyte supplies the hydrogen atoms (as distinguished from hydrogen gas) and hydroxyl ions at the surface of each oxygen consuming electrode by means of a corrosion couple consisting of the $Cd/Cd(OH)_2$ of the negative plates in electrical contact with the nickel or silver of the oxygen consuming electrodes. Depicted electro-chemically the corrosion couple is:

$$\ulcorner Ni/Cd, Cd(OH)_2/KOH(aq), H-Ni \urcorner$$

where the connecting line indicates contact between the nickel or silver areas. The reaction of the corrosion couple in reaction (5) is the following:

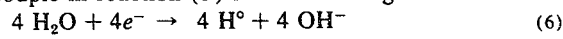
$$4 H_2O + 4e^- \rightarrow 4 H° + 4 OH^- \qquad (6)$$

Thus, when oxygen strips the surface of the oxygen consuming electrodes of hydrogen atoms, the reactions (5) and (6) then take place to supply new hydrogen atoms required by equation (4) and the $OH^-$ ions required by equation (5).

The electrons in equation (5) must travel from the negative battery plates 8 through an external electrical circuit to the oxygen consuming charge condition sensing electrode 16 where they are consumed in reaction (6). As long as oxygen is present, the electrochemical reactions (4), (5) and (6) represent a dynamic rate process where the rate of electron flow (i.e., the current flow) in the current sensing means 20 in FIG. 1 will be proportional to oxygen pressure (i.e., the unconsumed oxygen) in the battery and is a measure of the degree of charge or overcharge of the battery.

It is believed that the ability of the above mentioned corrosion couple to produce hydrogen atoms by equation (5), and hence absorb oxygen thereat, is a function of this closeness of the voltage of the oxygen consuming electrode 16 to that of the negative battery plates which is −0.8 volts in an alkaline cell with cadmium as the negative active material.

At moderate temperatures, no hydrogen gas ($H_2$), is given off during the charging of the battery. However, at low temperatures (such as 0°C. and lower), and relatively high charge rates (e.g., charge currents of at least about two times the ampere hour rating of the battery at 0°C. or one-half the ampere hour rating at −40°C.), hydrogen gas is given off due to the reaction:

$$2H_2O + 4e^- \rightarrow H_2 + 2 OH^- \qquad (7)$$

The current sensing means 20 which, for example, may be a relay magnetic amplifier or transistors circuit, controls a charge control means 23 in the circuit between the charging current source 22 and the positive and negative battery terminals 10 and 12. The charge control means 23, may, for example, be a set of relay contacts, an electronic switch or a magnetic switch. The current sensing means 20 is designed to operate the charge control means to decouple or disconnect the charging current source 22 from the battery when the current flow between the negative battery plates 8 and the oxygen consuming electrodes 16 is at a level, referred to as the trip level, which represents the fully charged condition of the battery which, as previously indicated, is generally a current level well in excess of the current level at the beginning of oxygen generation.

When the battery is fully charged and a load device 24 is connected between the battery terminals 10 and 12, the battery will discharge. If oxygen generation would stop on discharge, as it would be expected to do, the current flow through the current sensing means 20 would start immediately to decrease as the oxygen consumption of the oxygen consuming electrode 16 proceeds. The charge circuit of the battery would then soon become operative again as the current dropped below the aforesaid trip level (or a somewhat lower trip level where a relay is utilized because the pull-in current of a relay is generally somewhat higher than the drop-out level). However, oxygen generation surprisingly continues for a while after termination of a battery charge operation. The build-up of pressure within the casing 4 is prevented, however, by the platinum electodes 22 which absorb the oxygen generated within the casing and, in the absence of a fairly efficient oxygen absorbing means, as previously indicated, current above the trip level would continue to flow after termination of the charging operation. This oxygen could be absorbed if the surface areas of the oxygen consuming charge condition sensing electrodes 16 were utilized. However, it was discovered that, by providing porous platinum electrodes 19 connected to the negative battery plates 12 through a low impedance path,large amounts of both hydrogen and oxygen can be quickly absorbed.

Figure 2:
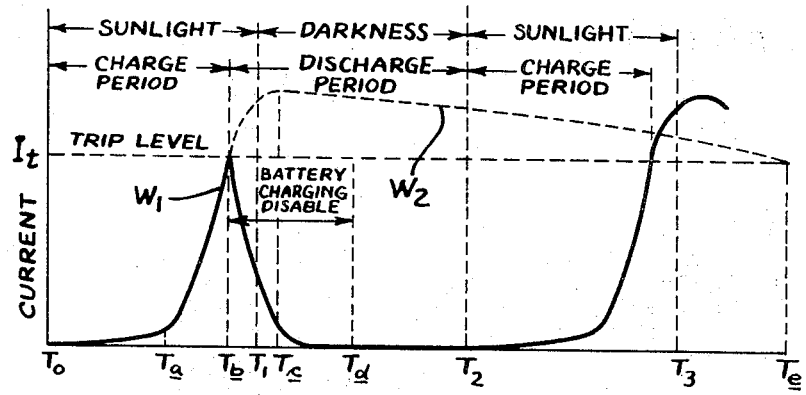
FIG. 2 is a diagram illustrating the operation of the battery system of FIG. 1 utilized in a satellite where the batteries are charged from solar cells.

To illustrate what would happen in the absence of a good oxygen absorbing means in the casing 4, reference should be made to the waveform W1 in FIG. 2 which shows the variation in the current flow through the current sensing means 20 when the battery charged system thereshown is utilized in an earth orbiting satellite, where the charging current source 22 is one or more solar cells which operate to generate a voltage only when the satellite is subjected to sunlight. In FIG. 2, in the time interval between T0 and T1 the satellite passes through a sunlighted portion of its orbit. During the next time interval between T1 and T2, the satellite passes through a dark portion of its orbit, and during the subsequent interval between T2 and T3 the satellite again passes through a sunlighted portion of its orbit. It is assumed that the battery 1 begins to discharge when the satellite passes through a dark portion of its orbit where the solar cells 22 cannot supply current or voltage to operate the electrical equipment involved, and that the battery must be fully charged by the solar cells as the satellite passes through a sunlit portion of its orbit. It is also assumed that the current level It indicated in FIG. 2 represents the current flowing in the current sensing means 20 which indicates a fully charged condition of the battery, that is a condition when all of the nickelous hydroxide of the negative battery plates of the exemplary battery which can be oxidized has been oxidized for the charge current involved and at which level it is desired to interrupt the charging of the battery. This is the "trip level" referred to previously.

It can be seen in FIG. 2 that in the time interval between T0 and Ta the current flowing through the current sensing means 20 slowly increases due to the very slow generation of oxygen during the non-critical portions of the charging cycle. However, at time Ta the rate of oxygen generation and the current flow between the negative plates 8 and the oxygen consuming electrodes 18 suddenly increases, and at time Tb the latter reaches the trip level It where the current sensing means 20 operates the charge control means 23 which disconnects the solar cells 22 from the battery 1. Due to the presence of what is believed to be unstable oxides, oxygen actually continues to be generated at a high rate even after disconnection of the solar cells from the battery, and where there is a limited oxygen consuming capability in the battery, as shown by waveform W1, the oxygen pressure and the current flow in the current sensing means continues to increase for a while in the interval between times Tb and Tc. A point is reached at the time Tc, however, when the limited rate of oxygen generation of the unstable oxides gradually tapers off to a point where oxygen consumption is greater than the oxygen generation. Then the current in the current sensing means 20 and the battery pressure starts to decrease gradually. A battery charging operation cannot resume until the current in the current sensing means 20 drops to the trip level $I_t$. The time it takes for the decay of this current to the trip level is determined by the ability of the oxygen consuming electrodes 16 to consume the oxygen remaining in the battery. As previousl indicated, when porous platinum group metal electrodes 19 are utilized, oxygen (and hydrogen gas) absorption proceeds at such a fast rate that the waveform W1 of current flow in the current sensing means drops almost immediately after charging ceases. However, in the absence of a good oxygen absorbing means like the platinum electrodes, the decay of the current starting at time Tc follows the dashed curve W2 where the current would not decay below the trip level $I_t$ until the time Te occurring during the next dark period beginning at time T3. The entire sunlit period T2-T3 would then be unused for charging the battery 1 so the battery would be unable to supply adequate electrical power to operate the electrical equipment involved during the dark period beginning at time T3.

Refer now to FIGS. 3 and 4 which illustrate a preferred prismatic dry cell battery useable in the battery charge system of FIG. 1. As there illustrated the casing 4 comprises an open top housing body 4a of generally rectangular configuration which may be made of insulating material or metal. The open top of the housing 4a is closed by a top wall 4b which is most advantageously made of insulating material. The top wall of the housing carries the positive terminal 10, the negative terminal 12 and the control terminal 18, which may be screw terminals to which the external circuits are suitable connected. The terminals 10, 12 and 18 have conductive portions 10' and 12' and 18' extending through and below the top wall 4b. The battery plates 6 and 8 have a generally rectangular configuration and are stacked in spaced parallel relation. The positive plates 6 have a series of connecting tabs 6a arranged in alignment and electrically connected in any suitable way to the positive terminal extension 10' as by suitable connector means 27 engaging all of the tabs 6a. The negative plates 8 have similar aligned tabs 8a which are connected by connector means 28 to the negative terminal extension 12'.

The positive and negative plates 6 and 8 alternate in position and the layers 14 of electrolyte impregnated separator material are sandwiched between the adjacent pairs of positive and negative plates. The separator layers may comprise a fibrous material, such as nylon, matted into a highly liquid absorbent body and may constitute a single length of separator material passing in zig-zag fashion between the various pairs of plates and around the sides thereof. The separator layers project a short distance beyond the normally top and bottom edges of the plates.

As illustrated, the oxygen consuming charge condition sensing electrode 16 is a porous plate located in the middle portions of the stack of positive and negative battery plates where it has access to maximum concentrations of electrolyte and water. The plate 16 may be positioned in place of one of the negative battery plates in the prismatic battery so it is enveloped by an electrolyte wetted separator layer 14' and opposite one or more positive plates. It is connected by a conductive link 35 to the conductive portion 18' of the control terminal 18 extending through the upper wall 4b of the battery casing.

The platinum electrodes 19 are porous plates placed on the outside of the stack of battery plates where they have the best access to any oxygen and hydrogen gases within the casing. Each of the porous plates 19 is sandwiched between an outermost layer 33 of nylon netting or similar perforated insulating material, and an inner layer 14'' of electrolyte absorbent material constituting a wick therefor. The platinum plates 19 have tabs 34 connected to the connector means joining the negative battery plates to the negative terminal 12.

The platinum group metal electodes may be platinum fuel cell electrodes, like the electrodes sold by the American Cyanamid Company with the designation AB6X. The electrodes found most suitable were 5 millimeters thick with about 8-10 milligrams of platinum black per square centimeters of the electrode mixed with graphite and Teflon particles pressed into a gold plated screen. The electrode porosity is preferably in the range of about from 50-85 percent.

Figure 6:
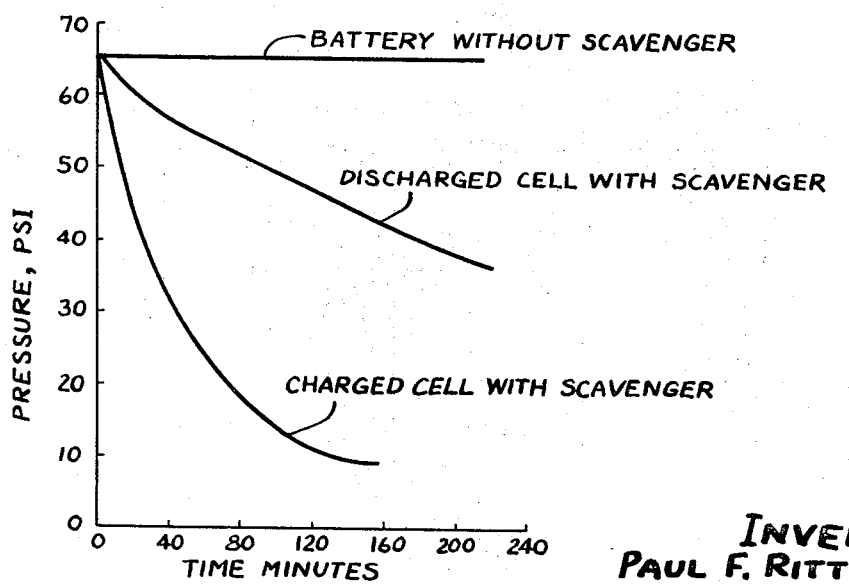
FIG. 6 is a diagram illustrating the hydrogen absorbing quantities of the platinum electrode of the battery of FIGS. 3 and 4.

FIG. 6 shows the unexpectedly large hydrogen absorbing qualities of one of the platinum electrodes 19 under charge conditions when connected to the negative battery plates through a low impedance path so that the voltage of the platinum electrode is substantially the same voltage as that of the negative battery plates. It was found, for example, that at temperatures down to −30 degrees Centigrade, batteries like that described could be charged with a current as much as 10 or more times the ampere hour rating of the battery. Also, when the battery is overdischarged, the current flowing through the battery can be as much as one-half or more times the ampere hour rating of the battery.

The rate at which hydrogen is consumed at the platinum electrodes 19 is dependent upon the partial pressure of hydrogen as previously indicated. When the hydrogen gas pressure was artifially made 50-65 pounds per square inch gauge, the consumption rate of each electrode 19 was about 0.1 milliliters of hydrogen gas per milligram of platinum. Such hydrogen gas absorption rate is entirely unexpected when the electrode is connected to the negative battery plates.

It should be understood that numerous modifications may be made in the preferred forms of the invention described above without deviating from the broader aspects of the invention.

I claim:
1. A dry cell battery system comprising: charge circuit means for the battery, load circuit means for the battery, a sealed battery capable of being repeatedly charged and discharged and including a sealed casing having exposed negative and positive terminals, and an exposed control terminal; positive and negative battery plates within said casing and electrically connected respectively to said positive and negative terminals, said negative battery plates having a potential in the range of about minus 0.7 volts to about minus 0.9 volts, and an electrolyte within said casing; means for connecting said charge and load circuit to said exposed positive and negative terminals; said battery forming with said positive and negative battery plates a rechargeable electrochemical system which in conjunction with said circuit means generates oxygen at leas during the overcharge of the battery and hydrogen at rates far above that absorbable by said battery plates; said high rate charging of the battery providing a progressively increasing amount of unconsumed oxygen which progressively builds up the pressure within the sealed battery casing (a) as the fully charged condition of the battery is approached, (b) during overcharge thereof and (c) for a while following the subsequent interruption of the charging thereof; porous oxygen consuming electrode means within the casing electrically connected to said control terminal; current responsive means connected between said negative battery terminal and said control terminal; the porous oxygen consuming electrode means effecting consumption of only a part of the oxygen generated during the charging of the battery, said oxygen consumption resulting in the flow of current through said current responsive means connected between said negative and control terminals of the battery, the value of which current progressively increases with the amount of unconsumed oxygen and the consequent build-up of pressure in the casing; said current responsive means being responsive to the flow of current between said control and negative terminals at a given trip level representing a desired fully charged condition of the battery by operating said charge circuit means to terminate the high rate charging of the battery; and additional gas consuming electrode means in said casing comprising porous platinum group metal electrode means within said battery casing connected only to said negative battery plates, said platinum group metal electrode means consuming substantially all the unconsumed oxygen remaining in the battery after termination of the battery charge at a relatively fast rate to bring said current flow in said current responsive means relatively rapidly below said trip level to enable the battery to be recharged again and also consuming substantially all of said generated hydrogen.

2. The dry cell battery of claim 1, wherein said porous oxygen consuming charge condition sensing electrode means is mounted within the stack of positive and negative battery plates and said platinum group metal electode means is mounted on the outside of said stack of positive and negative battery plates.

* * * * *